(12) United States Patent
Ohashi

(10) Patent No.: US 8,181,609 B2
(45) Date of Patent: May 22, 2012

(54) PROTECTIVE COLLAR FOR AN ANIMAL

(76) Inventor: Masae Ohashi, Tokyo (JP)

( * ) Notice: Subject to any disclaimer, the term of this patent is extended or adjusted under 35 U.S.C. 154(b) by 0 days.

(21) Appl. No.: 12/653,263

(22) Filed: Dec. 11, 2009

(65) Prior Publication Data

US 2011/0139091 A1 Jun. 16, 2011

(51) Int. Cl.
*A01K 13/00* (2006.01)

(52) U.S. Cl. .......... 119/815; 119/821

(58) Field of Classification Search .......... 119/714, 119/815, 821, 855, 856; D30/151, 152; 47/2, 47/20.1, 24.1, 29.1, 29.2, 29.5, 30, 31
See application file for complete search history.

(56) References Cited

U.S. PATENT DOCUMENTS

| | | | | | |
|---|---|---|---|---|---|
| 778,688 | A | * | 12/1904 | Marsh | 47/29.3 |
| 1,004,507 | A | * | 9/1911 | Walz | 2/4 |
| 1,960,312 | A | * | 5/1934 | Landorf | 2/133 |
| 2,188,787 | A | * | 1/1940 | Keener | 128/879 |
| 3,013,530 | A | * | 12/1961 | Zeman | 119/815 |
| 3,036,554 | A | * | 5/1962 | Johnson | 119/821 |
| 5,012,764 | A | * | 5/1991 | Fick et al. | 119/821 |
| 5,197,414 | A | * | 3/1993 | Kanakura | 119/839 |
| 5,797,354 | A | * | 8/1998 | Marschall | 119/815 |
| 6,044,802 | A | * | 4/2000 | Schmid et al. | 119/856 |
| 6,227,148 | B1 | * | 5/2001 | Wexler | 119/837 |
| 6,786,028 | B1 | * | 9/2004 | Longtin | 54/79.2 |
| D506,296 | S | * | 6/2005 | Driver | D30/152 |
| D562,505 | S | * | 2/2008 | Fujita | D30/152 |
| 7,523,720 | B1 | * | 4/2009 | Lecy et al. | 119/832 |
| 7,765,957 | B2 | * | 8/2010 | Behravesh et al. | 119/815 |
| D631,210 | S | * | 1/2011 | Hurst | D30/152 |
| D632,851 | S | * | 2/2011 | Maroney et al. | D30/152 |
| 2008/0134990 | A1 | * | 6/2008 | Schwarz et al. | 119/815 |
| 2009/0056642 | A1 | * | 3/2009 | Markfield | 119/850 |
| 2009/0090307 | A1 | * | 4/2009 | Heister | 119/821 |
| 2009/0241855 | A1 | * | 10/2009 | Stocki et al. | 119/815 |

* cited by examiner

*Primary Examiner* — Rob Swiatek
*Assistant Examiner* — Ebony Evans
(74) *Attorney, Agent, or Firm* — Kubotera & Associates, LLC

(57) ABSTRACT

A protective animal collar having a collar body for forming a barrier for an area from the base of the neck to the head of the animal, a member having openings therein covering one end of the collar body.

10 Claims, 5 Drawing Sheets

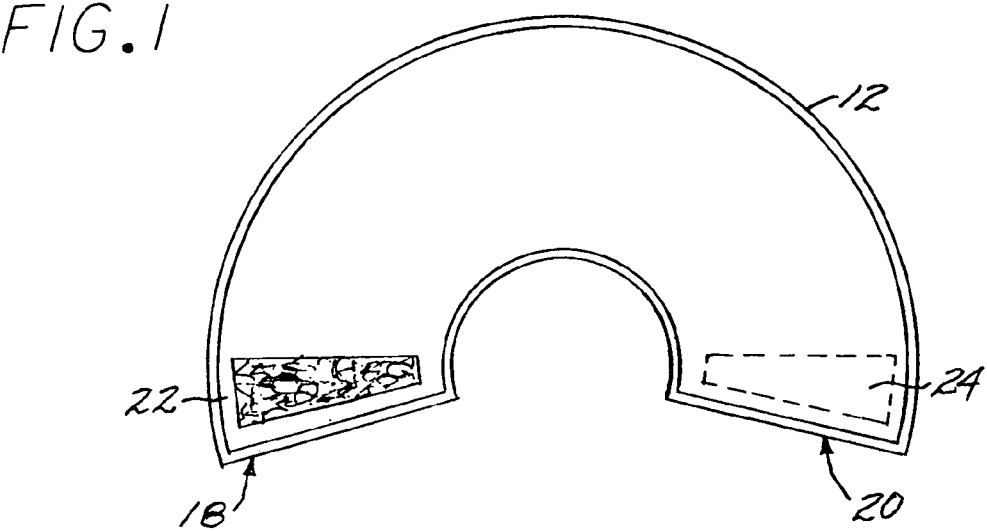
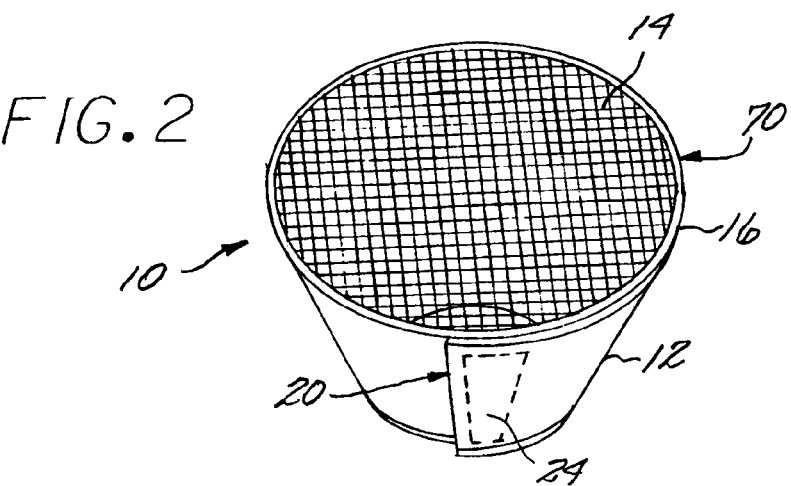
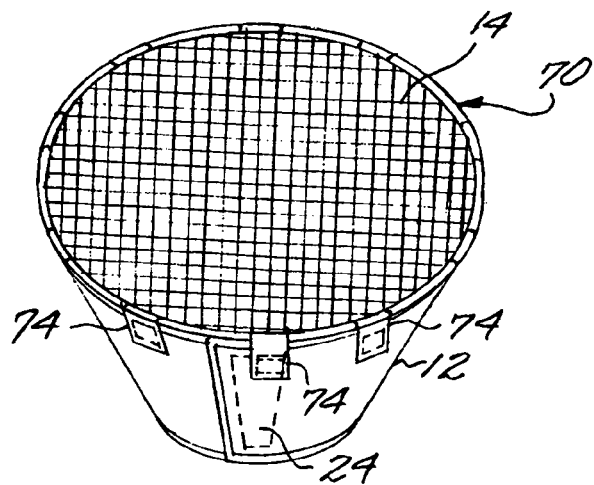

PROTECTIVE COLLAR FOR AN ANIMAL

BACKGROUND OF THE INVENTION

1. Field of the Invention

The present invention provides a device for preventing an animal from injuring itself and, in particular, a collar which prevents the animal from biting or licking portions of its body.

2. Description of the Prior Art

Conventional animal collars come in funnel, cone, truncated cone, disc and doughnut shapes and either surround the animal's face or neck region, or cover the area from the neck to the trunk, forming a barrier, in order to keep the animal's muzzle away from the rest of its body. In order to allow the animal to breathe, eat and drink, the upper parts of these collars are open. When the animal walks or sits, the open upper portion is located directly in front of the face of the animal which enables those with flexible bodies or long limbs, trunks or tails to take their tail or paws in their mouths by twisting their bodies or looking down. In addition, since the size and shape of the collars are limited to allow the animals room to walk, it has not been possible to guard the animal's paws. Collars formed of synthetic resin also slip easily. In addition, it is typical for collars to be loosely attached to the neck allowing the collars to come off fairly easily.

In any event, conventional collars typically can not protect the body of the animal from gnawing or licking. Sometimes a protective cover is attached to the front or hind legs, tail or trunk which is effective in preventing licking. However, as expected, movement of the animal's head is not restricted. For that reason, even if the cover is made of a hard material, it may be gnawed on and broken.

Sometimes muzzles or halters are used temporarily during treatment. However, since these cover or stabilize the animal's muzzle, it becomes difficult for them to breathe. In addition, if the animal has vomited, they are unable to spit it out, and there is a danger that they will choke and suffocate. In addition, muzzles and halters are geared for long-muzzled animals, and cannot be used on shorter-muzzled animals.

SUMMARY OF THE INVENTION

The present invention provides a device for covering the upper opening of the collar body forming a barrier that entirely covers the animal from below its neck to the top of its head. Thus, no matter how the animal maneuvers, the animal's muzzle cannot come out of the opening, and no part of its body can be taken into the opening. This makes it possible to reliably protect the entire body of the animal. In addition, there is no need to widen the collar in order to create the barrier. For that reason, the entire shape can be made smaller and lighter. By making the cover easy to take on and off, eating and drinking are made possible, while the collar's conventional functions remain unimpaired. In addition, by attaching a neck supporter to the lower part of the collar body, an obstacle which acts as a stopper around the neck opening is created. Since the neck supporter is composed of an elastic material, it has an anti-slip effect as well, heightening the stopper effect, and it may be fitted and attached to the neck opening. It is then possible to reliably prevent the collar from slipping off the neck, and the effect of this covered protective collar becomes even more reliable.

In addition, as the cover and neck supporter may be attached and removed with ease, the shape of the collar may be changed to suit the animal's condition.

For example, a collar composed of a cover, collar body and neck supporter may be worn in four different ways; the collar body alone, collar and cover, collar and neck supporter, and collar, cover and neck supporter. In addition, by attaching a trunk directly to the collar body instead of a neck supporter, a stronger stopper effect may be gained. As the collar body is supported by the trunk, the burden on the neck can be reduced. In addition, since there is no need to size it to fit, the neck the collar can be attached with room for movement.

In addition, by attaching a trunk directly to the neck supporter, a stronger stopper effect is gained and large necked animals can be accommodated.

Since the collar body is preferably composed of breathable, absorbent, fast-drying fabric, heat and humidity inside the collar is prevented, and inflammation due to saliva and dirt around the mouth is also averted. The collar body is easily washable, and simple to keep hygienic. In addition, since the collar body is light, flexible, and comfortable, the burden from use is reduced, and long-term use is made possible. When the collar body is constructed from elastic, flexible mesh, it is light, breathable, and both easy to see and easier to walk in, so the burden caused by use is reduced.

Due to the features noted hereinabove, the body and head of the animal are protected from gnawing and licking, which helps speed recovery from an injury and there is no need for the owner to constantly watch the animal. In this way, the present invention reduces the mental, physical and economic burdens of an animal owner.

DESCRIPTION OF THE DRAWINGS

For a better understanding of the present invention as well as other objects and further features thereof, reference is made to the following description which is to be read in conjunction with the accompanying drawing therein:

FIG. 1 is a plan view of a collar body pressed substantially flat;

FIG. 2 is a perspective view of a first embodiment of the protective collar of the present invention utilizing the collar body of FIG. 1;

FIG. 3 shows a second embodiment of the present invention wherein the collar of FIG. 2 modified so that the cover is removable;

DESCRIPTION OF THE INVENTION

Figure 4:
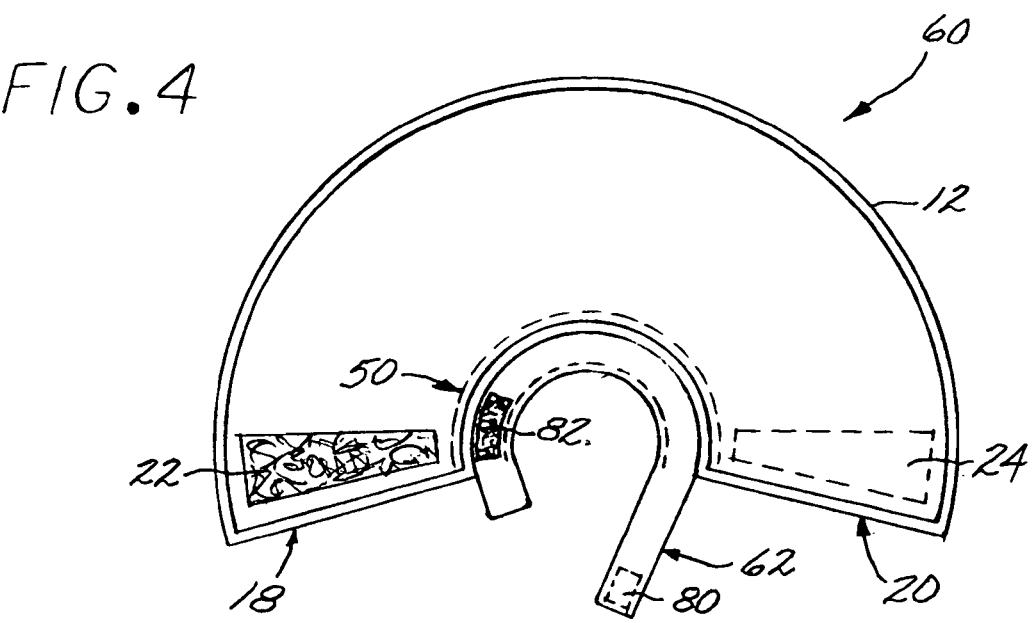
FIGS. 4 and 5 show a third embodiment of the present invention wherein the collar body of FIG. 2 is modified to incorporate a neck supporter.

FIGS. 1 and 2 illustrate a first embodiment of the protective collar 10 of the present invention. Collar 10 comprises a head portion 12, and a mesh member 14 which is secured to the far end 16 of head portion 12. Head portion 12 has a frusto-conical shape when the ends 18 and 20 are secured together. Velcro strips 22 and 24 provide an example of one type of mechanism for connecting ends 18 and 20 together to form the assembled head portion 12 shown in FIG. 2.

The collar body 12 is preferably in the shape of a truncated fan, or hollow cone, and has openings at each end, the first opening at the smaller end (lower part) of the collar body 12 being sized to take into account the neck circumference of the animal.

The second (upper part of collar body 12) opening is sized to take into account the circumference of the animal's head, the diameter being wide enough to prevent the muzzle of the animal from protruding. The rim, or circumference, at the edge of the collar body 12 is covered by tape made of fabric (cotton or nylon) or of thin rubber, which is either glued or sewn into place.

The collar body 12 is preferably fabricated from fiber material (exterior) and microfiber material (interior) and attached to cover 14 and neck supporter 62. In addition, using microfiber material for the collar body interior has significant positive effects; it absorbs the animal's saliva and the dirt around the mouth, and, is quick drying, preventing the collar from becoming hot and humid, and preventing inflammation around the mouth of the animal.

Since collar body 12 is made of cloth, it is also easy to wash, and hygiene is easier to maintain.

A fastening system, such as Velcro portions 22 and 24, are glued or sewn to both ends of the collar body 12. To use the protective collar, both ends of the collar body 12 are opened wide, placed over the animal's head (beginning in front of its face and moving backwards), and secured so that the body of the collar becomes shaped like a hollow cone.

The fastening systems 22 and 24, at both ends of the collar body 12 are adjusted to fit the circumference of the neck, after which the collar is secured.

The cover, or lid, 14 is preferably formed of mesh of an elastic synthetic resin such as polyethylene and shaped like a disc of a size sufficient to cover the second opening of collar body 12.

Cover 14 is fixed in place by gluing or sewing it to specific points along the rim of the upper part of the collar body 12 so that gaps cannot form in between the cover and collar body rim.

FIG. 3 is a perspective view of a second embodiment of the protective collar of the present invention wherein cover 14 is removably connected to head portion 12 via a plurality of Velcro systems 74.

Figure 5:
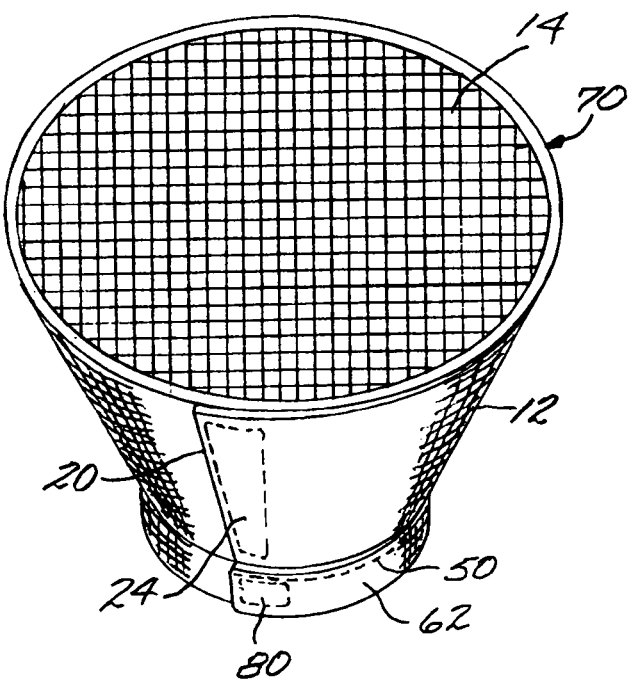

FIGS. 4 and 5 illustrate neck supporter 62 joined to animal trunk portion 30 and to the lower part of the collar body 12, the latter with sewing pattern 50.

The neck supporter 62 is made either of a soft, anti-slip stretchy fabric or of flexible fabric. It is band-shaped (other shapes can be used) with its length correlated with the first opening of collar body 12 and the fastener 80 and 82, and its breadth the distance between the base of the head and the top of the head of the animal. A fastening system comprising strips 80 and 82 is glued or sewn to both edges of the neck supporter 62.

The neck supporter 62 is stabilized by being sewn to the inside of the first opening in the collar body 12. Alternatively, a fastening system for easy attachment and removal is either glued or sewn to the interior of the upper part of the neck supporter 62 and the lower part of the collar body 12.

Figure 6:
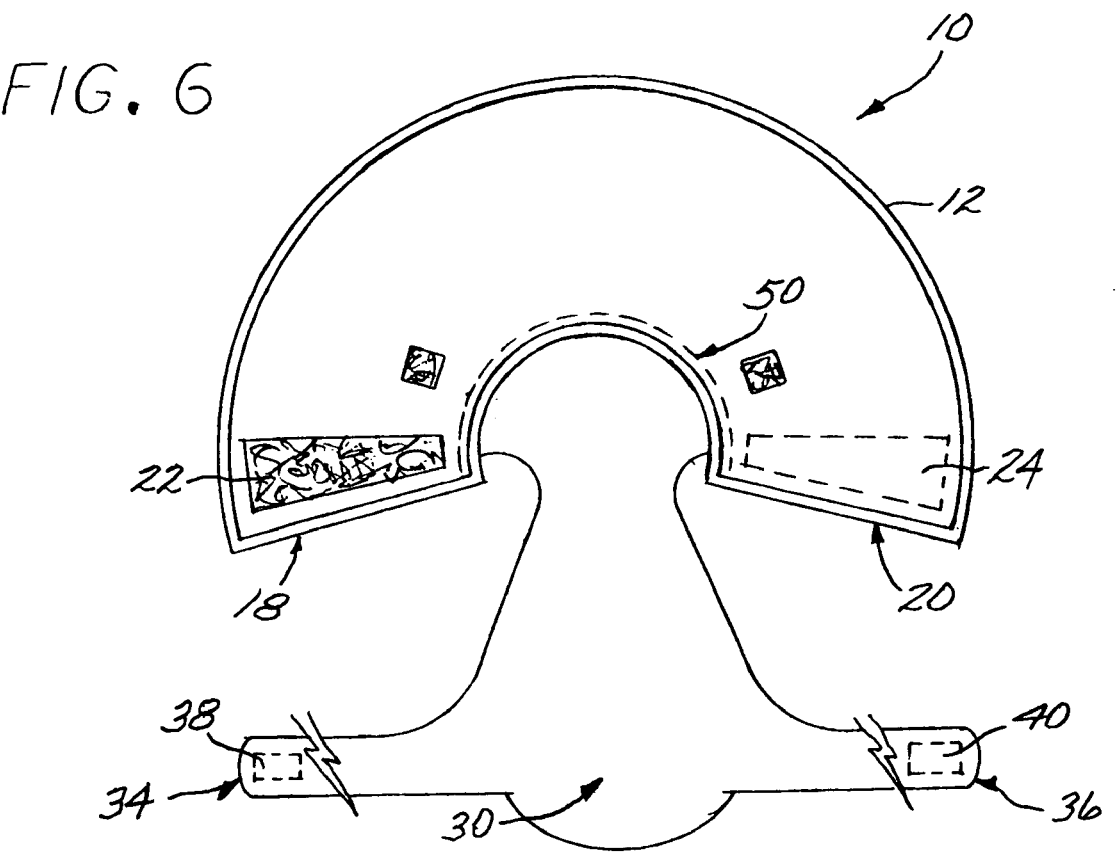
FIGS. 6-9 illustrate a fourth embodiment of the protective collar of the present invention.
Figure 7:
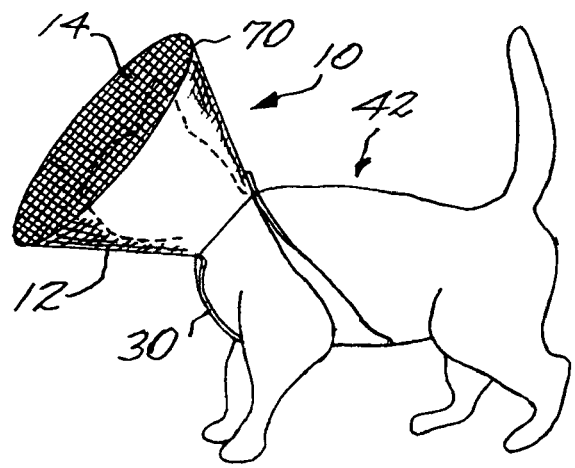

FIG. 6 illustrates animal trunk 30, preferably comprised of stretchy, breathable cloth, and shaped to cover the animal's neck and chest, with strap ends 34 and 36 stretched out like bands to the left and right. Fastening systems 38 and 40 for easy attachment and removal of trunk 30 are either glued or sewn to the ends of both the bands to secure them directly to the back of the collar body 12 as illustrated. FIG. 7 illustrates the assembled collar body 12 and trunk 30 positioned on animal 42.

It should be noted that the shape of the collar body 12 is not limited to that of a hollow cone. For example, it may be a hollow semi-sphere or sphere. Additionally, while the preferred material for collar body 12 is breathable, absorbent, quick-drying cloth, a flexible, elastic synthetic resin mesh such as polyethylene, other non-metal materials may be used.

The material which faces the rims of both the second and first openings of the collar body 12 and the cover 14, may be made of fabric materials such as cotton, nylon or faux leather, or of thin rubber material. Instead of being made of mesh, the cover 14 may be a member with multiple holes, provided that the holes are of a size to prevent the tail, front or hind legs from being taken in, and provided that the breathing of the animal is not impaired.

The shape of cover 14 may be a projecting dome shape or cap shape. As long as the upper (second) opening of the cover is completely covered, any shape will suffice. However, a shape that dips down into the interior of collar 12 is unsuitable. Flexible, synthetic resin mesh of a material such as polyethylene is preferable, but other materials may be used. However, metals, soft materials that could become twisted inside the collar, and opaque materials are not suitable.

The collar body 12 and neck supporter 62 may be made of the same material as cover 14 and manufactured as a single integral piece.

When an animal wears a collar with a cover attached, the animal cannot eat or drink at all, and it is unable to groom itself by licking. Where eating and drinking are concerned, at times appropriate to the condition of the animal, the cover may be removed (or, alternately, the collar may be removed for a short time), and meals and water given to the animal under the owner's observation.

The neck of the trunk 30 is sized to fit the inner diameter of the collar body 12, then sewn into place. Alternatively, a fastening system that allows for easy attachment and removal may be glued or sewn to the edges of the neck of trunk 30 and the lower part (first opening) of the collar body 12.

Figure 11:
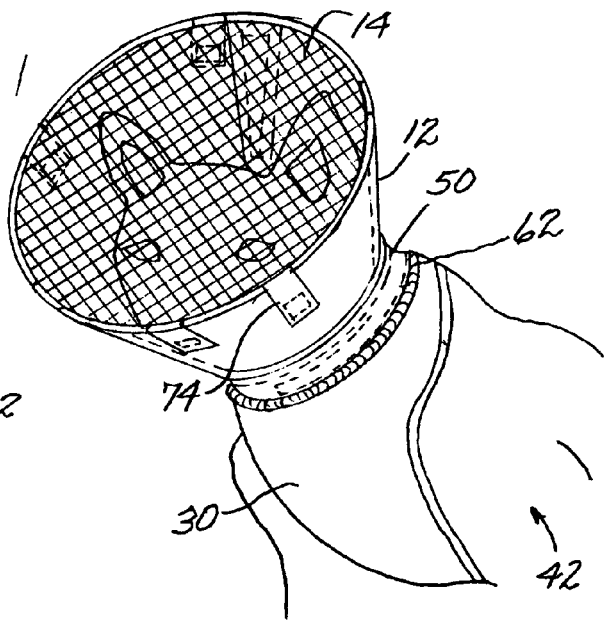

FIG. 7 illustrates the head of an animal 42 (cat shown) positioned within the protective collar body 10 with mesh member 14 attached to edge 70 of the upper part 14 collar body 12 via Velcro system member 74 (FIG. 11).

Figure 8:
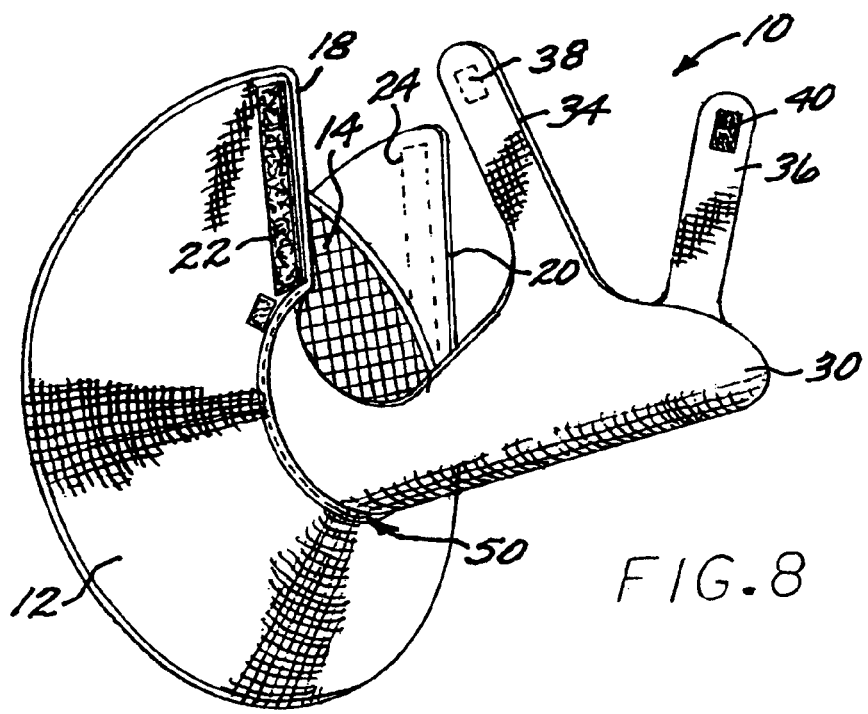

FIG. 8 is a perspective view of another embodiment of the collar of the present invention. Collar 10 comprises a head portion 12, and a mesh member 14 which is secured to the far end 16 of head portion 12. Head portion 12 has a frustoconical shape when the ends 18 and 20 are secured together, Velcro strips 22 and 24 providing an example of one type of connection mechanism. Collar 10 has an elongated trunk portion 30 and straps ends and 36 having Velcro members 38 and 40 to enable the collar 10 to be attached to the animal being protected. By attaching trunk portion 30 directly to collar body 12, a stronger stopper effect is provided. In addition, since the collar body 12 is supported by trunk portion 30, the stress on the animal's neck is reduced. Since there is no need to size collar body 12 to the neck, collar 10 can be attached with room for movement.

Figure 9:
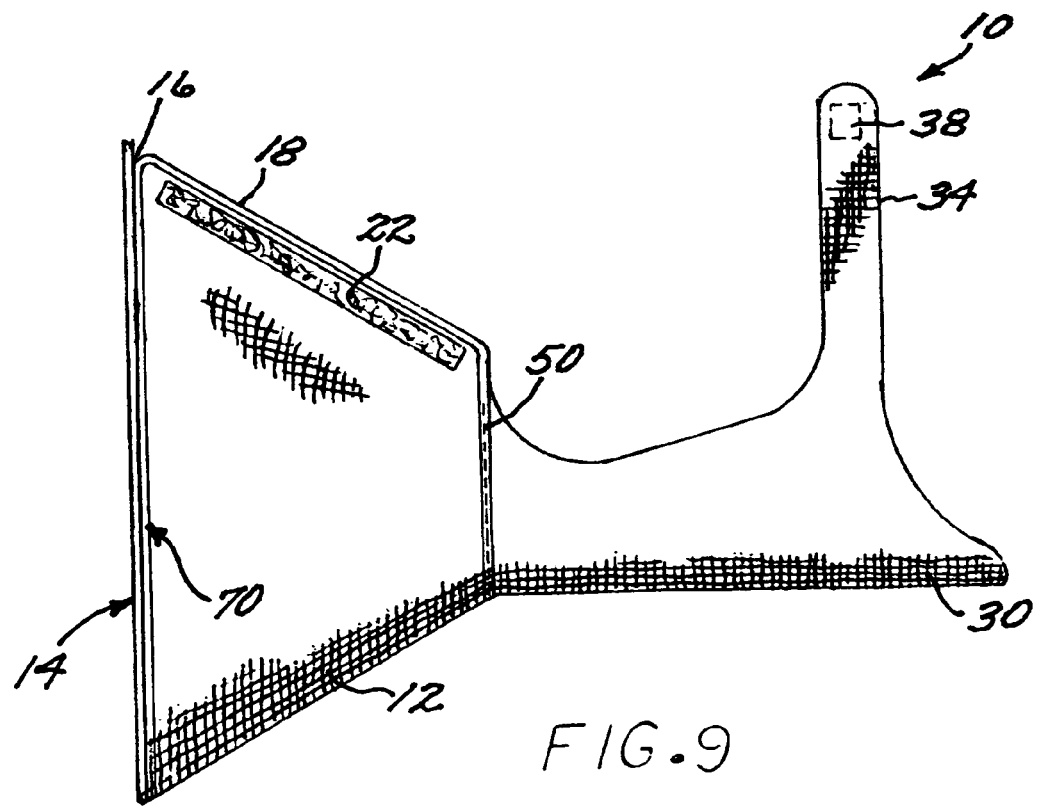

FIG. 9 is a side elevation view of the collar 10 shown in FIGS. 6 and 8.

Figure 10:
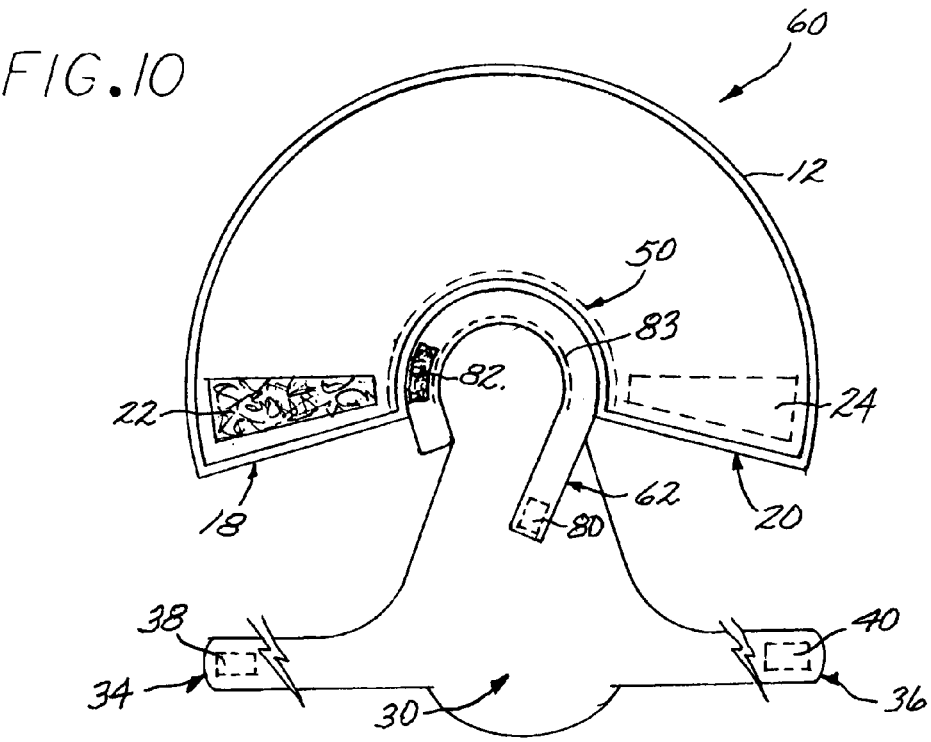
FIGS. 10-12 illustrate a fifth embodiment of the protective collar of the present invention.

FIG. 10 is a further embodiment of the present invention. In particular, a neck supporter 62 is interposed between collar body 12 and trunk portion 30. Trunk portion 30 is secured to neck supporter 62 by sewing pattern 83.

FIG. 11 illustrates the head of animal 42 positioned within collar body 12, the upper opening closed off by mesh cover 14. In this figure, the collar structure shown in FIG. 10 is utilized to enclose the head of animal 42.

Figure 12:
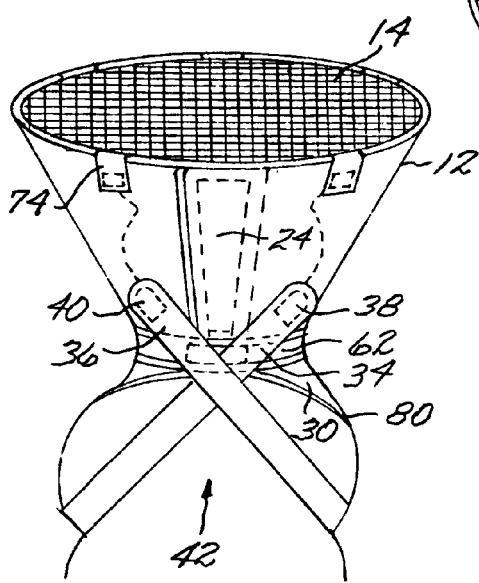

FIG. 12 shows how the strap ends 34 and 36 shown in FIG. 10 are connected to collar body 12.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A protective collar for protecting a head of an animal, comprising:
   a protective collar body having a first opening to be around a neck of the animal and a second opening to be situated ahead of the head of the animal, said first opening having a size smaller than that of the second opening so that the protective collar body is formed in a circular cone shape;
   a mesh member for covering the second opening; and
   a neck support having first and second ends, said first and second ends having a fastener, said neck support being formed in a band shape, said neck support having an upper edge attached to said first opening.

2. The protective collar of claim 1 wherein said mesh member is attached to the protective collar body with a fastener so that the mesh member is easily removable from said protective collar body.

3. The protective collar of claim 1 wherein said protective collar body includes an absorbent breathable member secured to an inside surface of the protective collar body.

4. The protective collar of claim 1 wherein said protective collar body is composed of a reticulated flexible synthetic resin.

5. The protective collar of claim 1 wherein said neck support is removable from said protective collar body.

6. The protective collar of claim 1 further including a trunk member for covering a body area of said animal, said trunk member being attached to the first opening of said protective collar body.

7. The protective collar of claim 6, wherein said trunk member includes a strap member to be wrapped around a shoulder portion of the animal and attached to the protective collar body.

8. The protective collar of claim 1, further comprising a neck support attached to the first opening for covering the neck, and a trunk member joined to the neck support for covering a body of the animal.

9. The protective collar of claim 1, wherein said protective collar body is formed of an opaque material to block eyesight of the animal sideways so that the animal can only see forward through the mesh member.

10. The protective collar of claim 1, wherein said protective collar body has a length from the first opening to the second opening large enough to block eyesight of the animal sideways so that the animal can see only forward through the mesh member.

* * * * *